United States Patent [19]

Kirkman et al.

[11] Patent Number: 5,056,053
[45] Date of Patent: Oct. 8, 1991

[54] ALGEBRAIC TRANSFORM MACHINE

[75] Inventors: W. Worth Kirkman, Fairfax; T. Michael Louden, Annandale, both of Va.

[73] Assignee: The Mitre Corporation, Bedford, Mass.

[21] Appl. No.: 517,522

[22] Filed: Apr. 27, 1990

Related U.S. Application Data

[63] Continuation of Ser. No. 142,068, Feb. 11, 1988, abandoned.

[51] Int. Cl.⁵ .............................................. G06F 7/38
[52] U.S. Cl. .................................................. 364/716
[58] Field of Search ....................... 364/716, 490, 491; 307/465

[56] References Cited

U.S. PATENT DOCUMENTS

| | | | |
|---|---|---|---|
| 4,656,592 | 4/1977 | Spaanenburg et al. | 364/490 |
| 4,700,187 | 10/1987 | Furtek | 307/465 X |
| 4,740,721 | 4/1988 | Chung et al. | 307/468 |
| 4,742,252 | 5/1988 | Agrawal | 307/465 |
| 4,745,579 | 5/1988 | Mead et al. | 365/104 |
| 4,758,747 | 7/1988 | Young et al. | 364/716 X |
| 4,763,020 | 9/1988 | Takata et al. | 364/716 X |
| 4,786,904 | 11/1988 | Graham, III et al. | 364/716 X |
| 4,787,047 | 11/1988 | Wei | 364/716 X |
| 4,845,633 | 7/1989 | Furtek | 307/465 X |

OTHER PUBLICATIONS

Design of Digital computers an Introduction, Second Edition, Gschwind et al., Chapter 9, 1975.

*Primary Examiner*—Dale M. Shaw
*Assistant Examiner*—Tan V. Mai
*Attorney, Agent, or Firm*—Choate, Hall & Stewart

[57] ABSTRACT

The computing machine includes an array of programmable elements programmably interconnected to implement networks of algebraic functions. Each element provides a sufficient set of logic primitives in the algebra that may be a Boolean algebra. The elements and the interelement wiring support the communications requirements of large classes of problems and preferably of all problems. The algebraic transform machine offers highly concurrent operation but avoids many of the programming difficulties of existing concurrent systems. The machine is regular in structure; it extends to large size and capability, and operates at high speed. In one embodiment, the machine consists of a grid of segments and each segment holds the value (true or false) of a Boolean variable. Crossing segments do not connect directly but the value on one wire segment can effect the value on another. The effect of one segment on another is programmable. An individual element or cell of the algebraic transform machine consists of one crossing and the circuitry associated with that crossing.

32 Claims, 6 Drawing Sheets

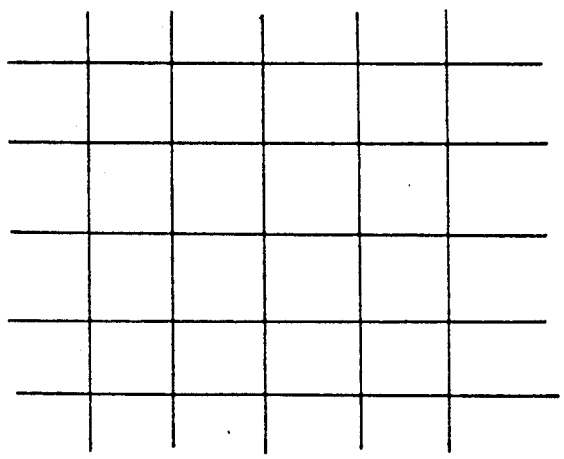
FIG. 1
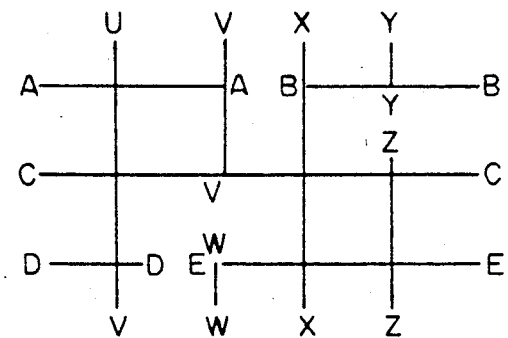
FIG. 2
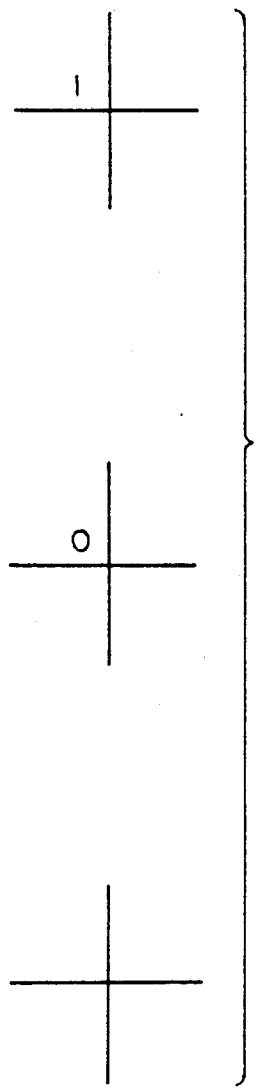
FIG. 3
FIG. 4
FIG. 5

ALGEBRAIC TRANSFORM MACHINE

This is a continuation of copending application Ser. No. 07/142,068 filed on Jan. 11, 1988 now abandoned.

BACKGROUND OF THE INVENTION

This invention relates to computing machines.

A Von Neumann sequential architecture computer operates on only one token of information at a time, and that token must be no greater than the word size of the machine. Operations are performed by gathering contributing pieces of information from memory into the processor, combining them according to instructions, and placing the result back into memory. Executing several instructions may be required to do the desired operation. Obviously, being able to operate on multiple tokens at the same time should allow the set of operations in a program to be executed much faster.

To execute these multiple operations, concurrent processing systems use multiple processors and often use multiple memories. There are many multi-processor configurations used, including parallel, pipe-lined, and adaptive structures. Except for special cases such as array processing, it has proven extremely difficult to assign operations on tokens to processors and memories in such a way that needed information can be obtained efficiently within the constraints of the system's architecture. Further, it is difficult to assign balanced workloads to the processors to maintain a high level of concurrency.

A good assignment of operations and tokens to processors and memory is one where the dependencies of the tokens match the communications channels between the processors and memories. On multi-processor systems, this means that clusters of interdependent pieces of information will be assigned to each processor/memory unit. Dependencies across cluster boundaries require communication between the high-level modules of the multi-processor. The efficiency of such inter-module communication is much less than the efficiency when implementing dependencies within one unit, so it is important that the boundaries of the processor assignments fall on cluster boundaries, and that the clusters themselves be created for minimum interdependence. Additionally, to use all the processors efficiently, an equal amount of work should be assigned to each processor. It is these constraints that are so difficult to satisfy in the programming of concurrent systems based on multiple processors.

SUMMARY OF THE INVENTION

The algebraic transform machine (ATM), according to the present invention, is an array (or orderly network) of programmable elements programmably interconnected to build networks of algebraic functions. Functions that perform storage, processing, communication, and control can be built according to the requirements of the application program. Because these functions are co-located with one another throughout the array, coexisting at the same time, the algebraic transform machine can do all independent operations concurrently.

In a preferred embodiment, each element is a small building block for the construction of Boolean logic primitives. In this embodiment, the machine includes a grid of connectable wire segments with each segment holding the value (true or false) of a Boolean variable. Where the segments cross, the value on one segment can affect the value on another and this possible effect of one segment on another is programmable. An individual algebraic transform machine cell or element consists of one crossing and the circuitry associated with that crossing.

The size and complexity of ATM resource cells can be much smaller than any type of processor. In this preferred embodiment, the cells or components are programmably structured to form Boolean logic functions. These functions could in turn be combined to form a structure that acts as a processor, but the basic cell is much smaller than a single processor, even that of the Turing Machine, the simplest of Von Neumann Machines. The structure is flexible enough to allow any desired operation to be programmed, without the constraints of a fixed instruction set. Further, this flexibility allows the structure of concurrent processing to match the structure of the application, thereby greatly reducing the constraining difficulties of concurrent programming of conventional machines.

The underlying structure of the resource cell or array element is regular, allowing the dimensions of the array to be scaled to large sizes. This allows the fabrication of large, highly concurrent systems without a fundamental change in system structure. Further, because of the regularity of the elements, the equivalence of any portion of the array to any other, and the built-in flexibility in interconnection, problems in defect management are greatly simplified. These characteristics of scalability and defect control solve the primary architectural problems in the creation of economical systems based on wafer scale intergrated circuitry.

Unlike application programs running on conventional general purpose computers, ATM programs do not leave large amounts of special purpose hardware unused because this application program does not need it while other applications require the special purpose hardware. Conventional machines often have large component counts with the accompanying higher cost because they sometimes run applications requiring special purpose hardware such as floating point processors, array processors, DMA controllers and video processors, although many of their applications never use this additional hardware. Because of the simplicity and regularity of the cells within an ATM, all available components can be used on any application, limited only by the natural size and structure of the problem statement. Thus ATMs by having higher component utilization can either improve performance or reduce component count and thus cost.

The ATM structure is general purpose in that it can support any of the applications supported by other architectures. However, it is unique in its support for two particular classes of applications. First are applications that require extremely fast solutions. When represented as networks of functions, the applications can be supported by direct implementation, if their size does not exceed available ATM resources. An ATM can then provide the high speeds previously only available from dedicated custom circuitry. Example of this class of applications include communications protocols, digital signal processing, image processing, regular expression matching, implementation of logic networks, simulation of neural networks, and data and pattern compression and expansion. The second class of applications are those that are unsupportable on other architectures because of sheer size. Because of the scalable concurrency of the ATM, some of these become tractable. Examples of this class of applications include large finite element analysis, fluid flow modeling, weather prediction, and simulations.

Programming an ATM differs substantially from programming conventional computers, with fixed architectures of computational logic. The difference is primarily that an ATM, compared to a fixed architecture machine, has neither architectural constraints on the structure of logical operations that can be performed, nor architectural constraints on the amount of concurrency used to solve the problem. Thus the programmer can express the logic of the application in any natural structure without constraint on the type of logic components used. However, it remains possible to move conventional applications to an ATM by programming the ATM to emulate a conventional computer. This would allow full compatibility with a large collection of application. Applications can then obtain the performance advantages of an ATM as needed by rewriting or recompiling selected parts. An additional alternative is the use of an ATM as a co-processor to accelerate special functions within a larger program being performed by a conventional computer host.

BRIEF DESCRIPTION OF THE DRAWINGS

FIG. 1 is a schematic illustration of a rectangular grid, which is used as the basis for the example embodiment of an Algebraic Transform Machine.

FIG. 2 is a schematic illustration of the allocation of variables to wire segments. Note that more than one wire segment can be co-linear, that is, can share the same row or column.

FIG. 3 is a schematic illustration of wire dependencies in the example embodiment of an ATM. In the top cell, the horizontal term must be true, i.e., the wire segment must have a high voltage, for the vertical term to be true. It is possible that the vertical term may be false for some other reason, not related to this cell. In the center cell, the horizontal term must be false, i.e., the wire segment must have low voltage, for the vertical term to be true. In the bottom cell, the vertical term does not depend on the horizontal term. This means that the horizontal wire segment can take on any voltage without causing the vertical term to be made false.

FIG. 4 is a schematic illustration of several cells connected in a grid with the vertical terms depending on some of the horizontals.

FIG. 5 is a schematic illustration of a grid of cells with dependencies of verticals on horizontals, and of horizontals on verticals.

FIG. 8 is a table of Phase Offset Components used to create the 2D-PEC interconnection pattern used in the preferred embodiment. The Distance Offset Components are numbers which when added together, give the distance between the row of interest, and the reference row passing through the 2D-PEC origin. For example, if rows are numbered from the origin starting at 0, the Distance Offset Components for row 9 would be $2^3$ and $2^0$. The phase of row 9 relative to row 0 is then the superposition of the phase shifts of rows 8 and 1.

Figure 6:
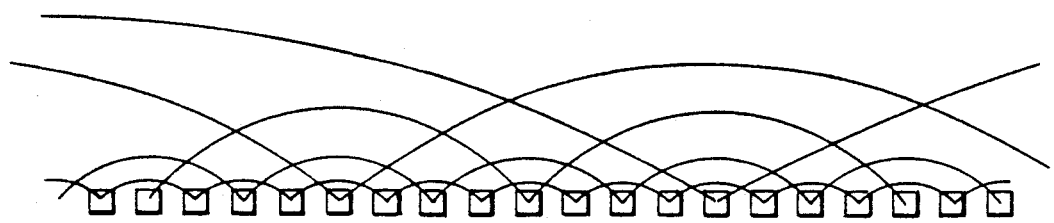
FIG. 6 is a schematic illustration of the one dimensional Packed Exponential Cycles (PEC) Interconnection pattern.

The Phase Offset Components describe the alignment or anti-alignment of the phase of a row with row 0. Each column in the table describes the phase at a different scale. For ease of reading, the columns have been grouped into sets of four. The heading over each group gives the scale of the right-most column in that group. For example, the right-most column describes the phase at scale $2^0=1$. A section of PEC of length 1 falls into one of two classes: the one cell can be connected at distance 2, or it can be connected at distance greater than 2. A 1 in the $2^0$ column indicates that the pattern in that row differs from row zero in this respect. A 0 means they have the same phase in this respect. For better readability, the all 0 column groups have been left blank.

The next to the right-most column describes the phase at scale $2^1=2$. As with length 1, a section of PEC of length 2 falls into one of two classes: the greatest length connection from the two cells is 4, or one of them is connected at distance greater than 4. A 0 in the $2^1$ column indicates that the first two cells in the row are the same in this respect as row 0. A 1 indicates they differ. In this respect, from row 0.

Phase offset components are superimposed according to the use of their associated distance offset components to build up to the appropriate phase offset at the distance of interest. For example, to determine the phase offset at distance 9 (see above), the offset components for $2^3$ (... 1000 1000 1000 1000) is superposed modulo 2 with that for $2^0$ (... 1111 1111 1111). In this case, the phase offset for row 9 is (... 0111 0111 0111 0111).

Note that the phase offset table is intended to extend infinitely downward, and each row of values extends infinitely to the left. For obvious reasons, the table has been truncated to $2^{31}$ across and $2^{31}$ down. Less obvious is that this truncation leaves a usable table. However, because of the regular and semi-repeating structure of the PEC pattern, this is in fact the case.

Figure 8:
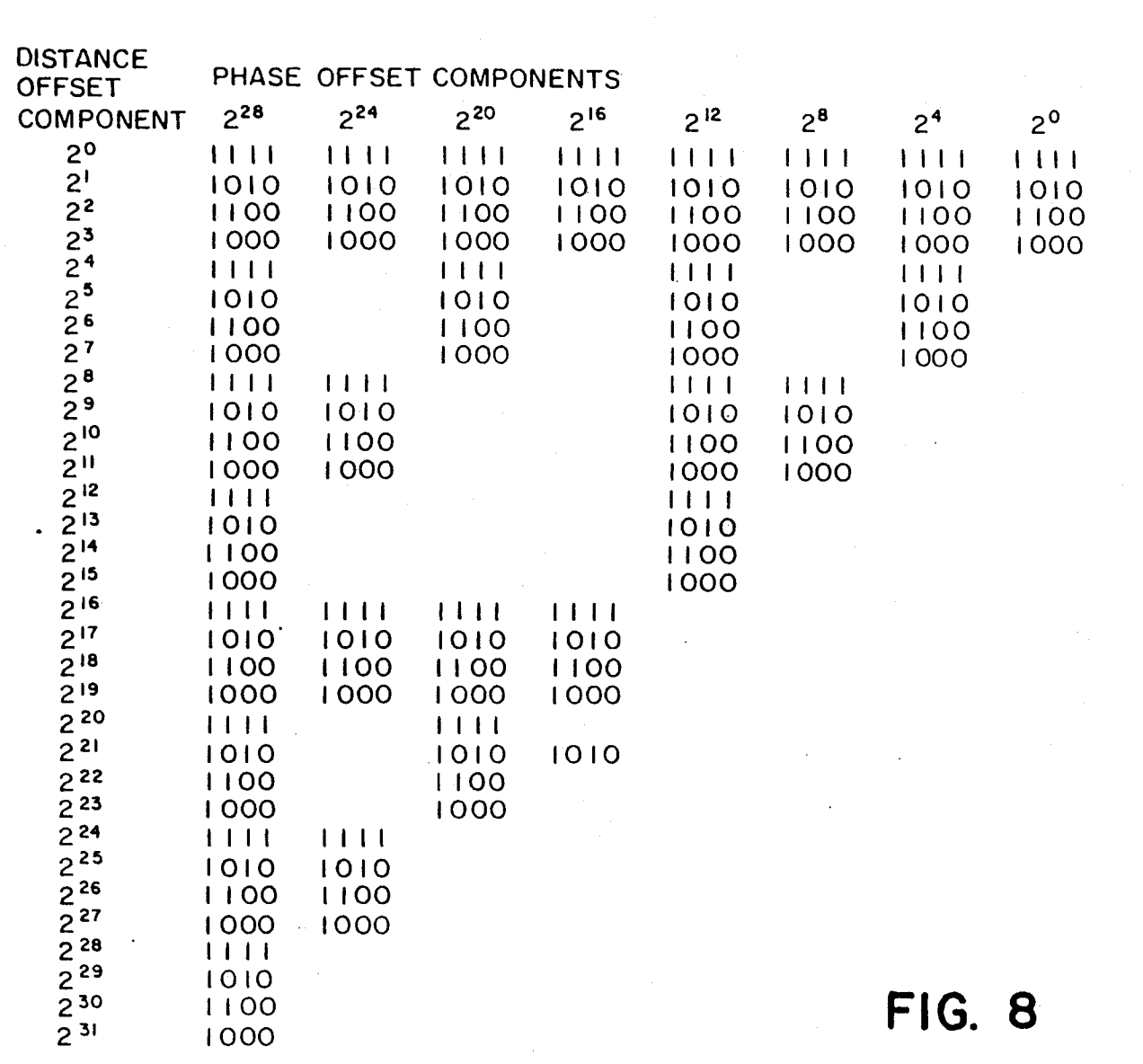

PEC repeats itself on any power of 2 boundary with the exception of a single value, which is the greatest distance connection within the boundary. Thus, the phase value for a given scale $2^s$ relates only to the insertion into the sequence of the number $2^{s+1}$. From the discussion of FIG. 10 it can be seen that the value of higher order phase components, just as with higher order distance components, is only of interest when the area of the ¼ plane approaches that value. Thus, for a ¼ plane of size less than or equal to $2^{15}$ by $2^{15}$, the table of FIG. 8 will suffice. For systems larger than this, the table's pattern of growth and repetition are readily discernible.

Figure 9:
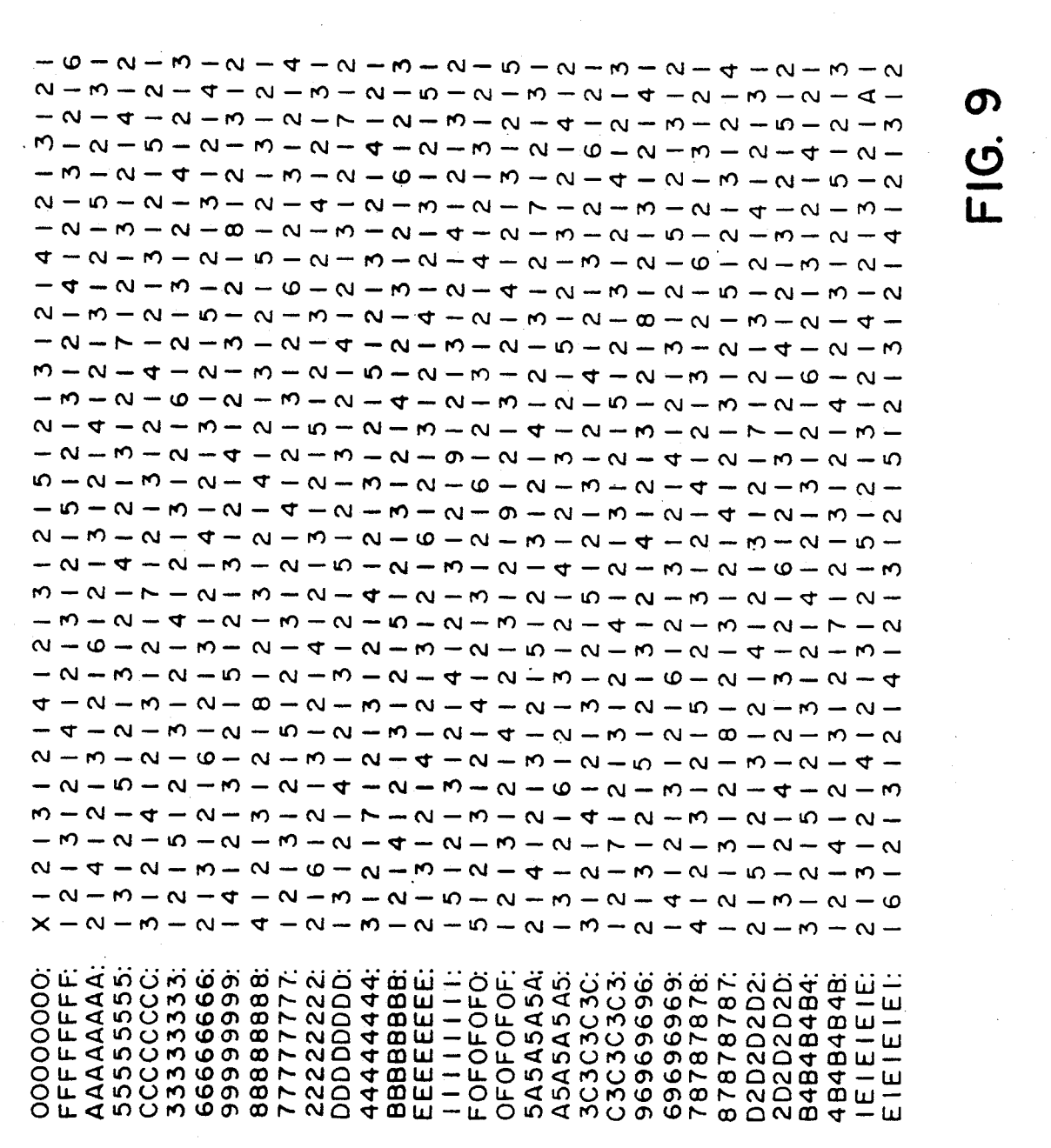

FIG. 9 is a schematic illustration of the Two Dimensional Phase Shifted Packed Exponential Cycles Pattern for a ¼ plane of size 32 by 32. The hexadecimal number to the left is the lowest order portion of the phase shift of that row relative to the top. Cells within the grid a represented by a single hexadecimal number which is the power of 2 giving the (non-nearest neighbor) connection distances for that cell. Thus cells with the same values that are closest within a row or column have a switchable connection extending between them.

The sole exception to this labeling scheme is the label "X" which appears in the upper left corner. This label represents a connection distance which is greater than any other in ¼ plane of chosen size. It may be regarded as infinite, or simply large (it extends beyond the grid).

Note that some of the connections, including the X connections, extend beyond the borders of the ¼ plane of chosen size. In one preferred embodiment, these (or some subset of them) can be used as connections for input/output to/from the ATM.

Figure 10:
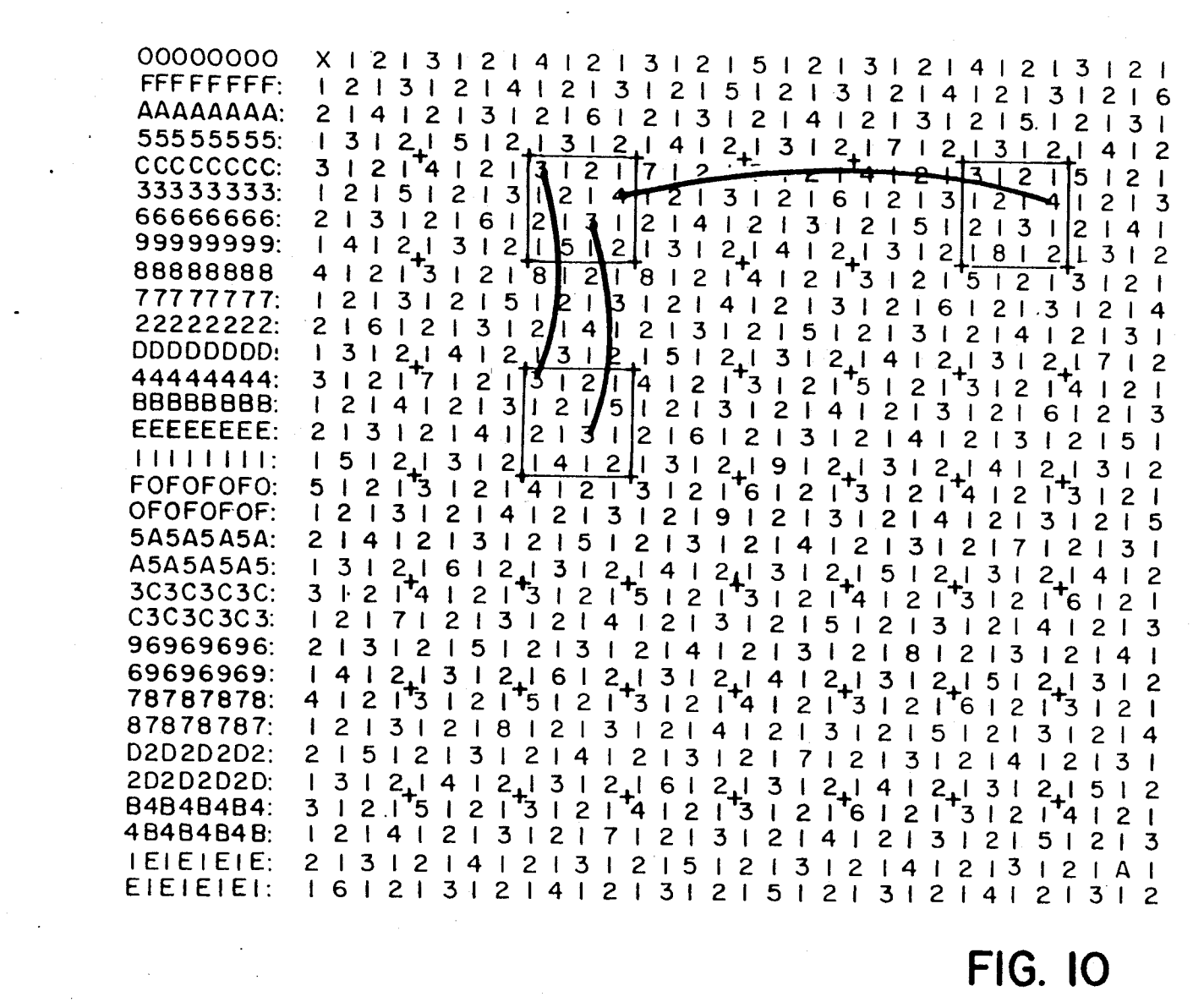

FIG. 10 is a schematic illustration of the connections that exist between tiles on the 2D-PEC ¼ plane. Note that the tiles are aligned to a grid of their own size and shape which begins at the origin.

Figure 11:
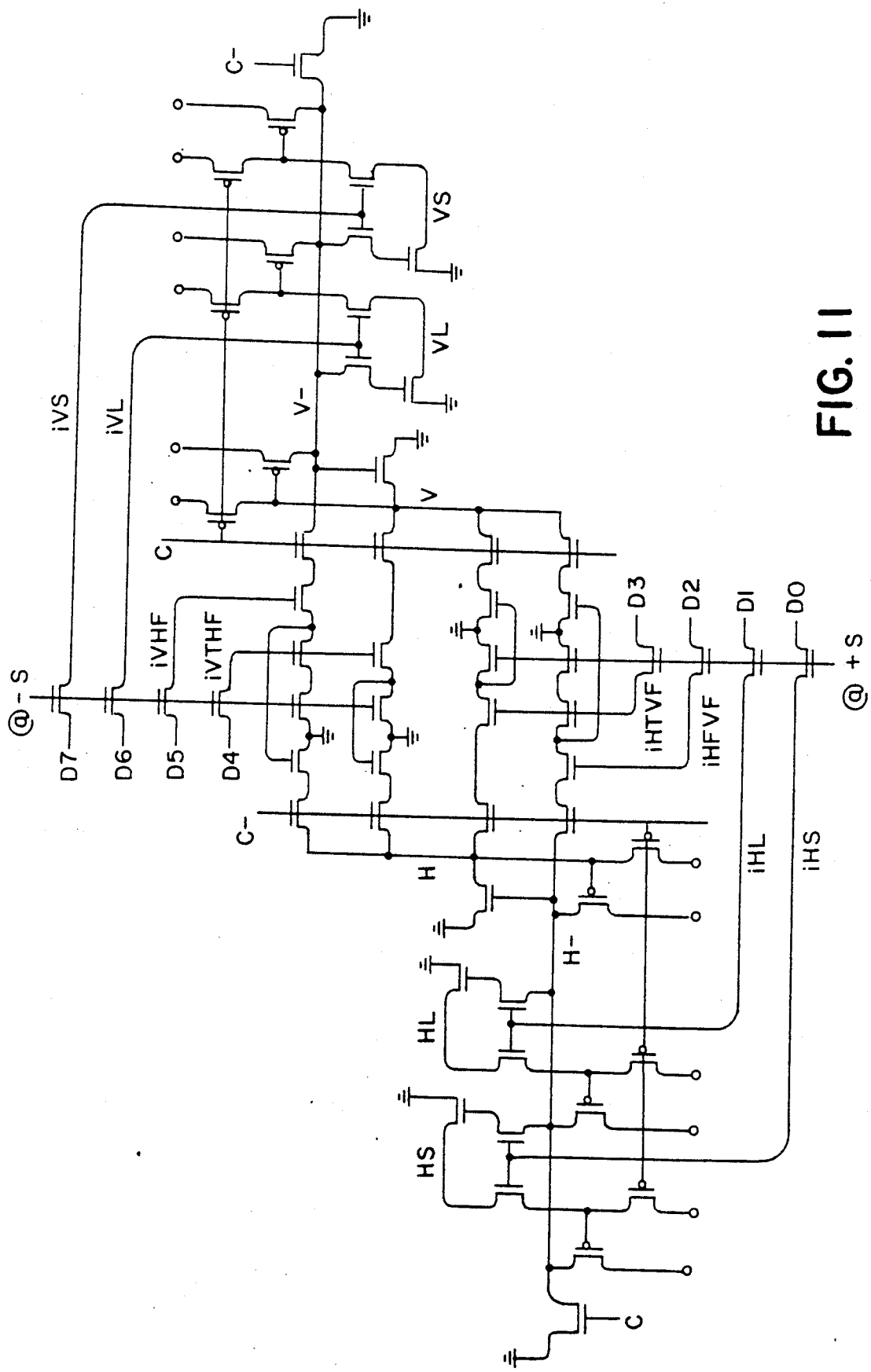

FIG. 11 is a schematic illustration of a C-MOS implementation of a cell of the preferred embodiment. The nodes of two other cells in the same row are connected by long and nearest neighbor connections respectively. Likewise, the H and V nodes of this cell are connected to the HL and HS, and VL and VS nodes of other cells.

Two of the horizontal connections are controlled within this cell (those to the cells whose H nodes appear here as HL and HS). The enabling of a connection between H and HL is controlled by a voltage stored on the node iHL. If the voltage on iHL is high, the connection is enabled. The value of iHL is loaded by raising the signal @−S high while D0 is also high. If the value of iHL is to be made low, it should first be made high and then brought low to reset the state of some of the internal sub-circuits. The connections between H and HS and between V and VL and VS are controlled in similar manners.

In the programming of control information, the select signals, @+S or @−S, are only allowed to be active (high voltage) when the Clock C is high or low respectively. The signal C− is the complement of C, and should be high when C is low, and low when C is high. The circuit is tolerant of some clock skew between C and C−.

The two select signals allow the re-use of the Program Data lines D4 through D7 as the lines D0 through D3 in the cell above. Thus, within the array, only 4 Program Data lines are needed per column, and only two Select lines are needed per row. This allows proper program storage into one half the control lines of all the cells in one row.

The dependencies between the horizontal and vertical sections of the cell are controlled by the four signals iHFVF, iHTVF, iVTHF and iVFHF. Their action is as follows: if iHFVF is high, then if H becomes low during its evaluation phase (while C is low and C high), V will be made low on its subsequent evaluation phase (when C is high and C− is low). Similarly, if iHTVF is high, then H remaining high throughout its evaluation phase will cause V to be made low. If iVL or iVS are programmed high, this information will propagate to remote and near neighbors respectively in one of the two vertical directions. Propagation in the other direction is controlled by other cells.

Those skilled in the art will appreciate that the cells and connections described above can be optical circujts or a mixture of optical and electrical circuits.

DESCRIPTION OF A PREFERRED EMBODIMENT

The theory on which the present invention is based will now be described. In this embodiment Boolean algebra is used as the algebra of the ATM. In general, any algebra can be used in this way. The component operations of any application program can be represented as sets of Boolean logic equations. In fixed architecture computers, these equations are implemented using a fixed palette of complex Boolean expressions that are the native instructions of the processor(s). The way these expressions are evaluated and combined is controlled by a set of input values that make up the text and data of the compiled program.

An ATM can implement Boolean logic equations directly. This is because the items on the "palette of native instructions" of this ATM are not themselves Boolean expressions, but are instead smaller fundamental components from which expressions can be built. The smaller components in this embodiment are the Boolean operations Product and Invert. These operations form a sufficient set for generation of any Boolean function; that is, any Boolean function can be expressed as the product of smaller Boolean terms, where the smaller terms may be inverted or non-inverted in the product. A Boolean variable that appears in an equation, either non-inverted or inverted, is called a Term Element, or TE.

An example of this construction of Boolean functions is the function:

$$X = A \cdot \bar{B} \cdot C + \bar{A} \cdot C$$

In this equation, X is the sum of two terms. The first term has three term elements, one of which (B) is inverted. The second term has two term elements, again with one inverted.

By DeMorgan's laws, we can rewrite this equation as $$\bar{X} = \overline{A \cdot \bar{B} \cdot C} \cdot \overline{\bar{A} \cdot C}$$

In this second equation, the inverse of X is expressed as the product of two inverted terms (the same terms that were being added before). These two terms are now term elements of X inverse. This second equation is composed of only the operators available in the preferred embodiment of an ATM.

To describe the architecture of one embodiment of the invention, we must describe the basic cells that make up the ATM array, the interconnection pattern for the cells, and how Boolean logic functions are implemented using the cells and interconnect pattern.

One embodiment of the ATM is a rectangular array of wire segment crossings. To show the concept, we shall draw this as if each crossing is connected to the adjacent crossings, a pattern called nearest-neighbor connected. This is only a subset of the more powerful connective structure of this embodiment (described below), but it simplifies the explanation. If, however, we were to build a nearest-neighbor-connected ATM, it would be a grid of wire segments, as shown in FIG. 1.

The horizontal and vertical wires created by the connections of the crossings are the primary elements of this ATM. These wire segments should not be thought of as carrying information from source to destination. Instead, each segment holds a value represented by its voltage, a voltage that exists along the entire length of the wire and that can be operated on at any point along that wire. Each wire can have one of two voltages: high and low. These two voltages represent the two possible values of a Boolean variable. Boolean values are sometimes referred to as 1 and 0, sometimes true and false. We shall use true and false in this ATM description.

When the wire segments cross, they do not connect directly. Instead, at those places there is circuitry by which the voltage on one wire can affect the voltage of another. The circuitry by which one wire affects the voltage of another allows the construction of products from term elements.

In the functioning of this ATM, first the voltages on the horizontal wire segments determine the voltages on the vertical wire segments. Next, the voltages on the vertical wire segments determine the voltages on the horizontal wire segments. Then back to horizontals determining verticals, and so on. This requires two sets of circuitry at each crossing, one for the effect of the horizontal on the vertical, and one for the effect of the vertical on the horizontal.

The cycling from horizontal to vertical is controlled by a clock. This provides for a controlled transfer of information from term to term, but it has serious implications on the amount of circuitry and the distance through which information can be allowed to propagate in either vertical or horizontal directions. This creates a relationship between the maximum clock speed for a term and the maximum number of Term Elements that can be combined to form that term, and hence the sizes of terms.

The possible effect of one wire on another is programmable. This aspect will be discussed below. One other part of the ATM is programmable. The connections of crossings to their nearest neighbors, referred to above, are more correctly referred to as potential connection paths. Whether a potential connection with another crossing is actually made is programmable. This allows connecting physical horizontal (or vertical) wire segments into one larger wire segment, as is shown in FIG. 2. The unconnected collinear pieces have no effect on each other. This programmable connection saves space by allowing several distinct terms (wire segments) to share one physical row or column of cells.

A cell in this ATM (hereafter simply referred to as "a cell") consists of one crossing and the circuitry associated with that crossing. This circuitry consists of two sets of circuitry to allow the inclusion of one wire segment as a term element of the other and two switches that make or break the connections of a cell with its neighbor to the right and with its neighbor below it.

We shall now describe the functioning of a cell in the first part of a clock cycle, during which the voltages on the horizontal wire segments determine the voltages of the vertical wire segments.

The effect that each pair of horizontal and vertical wire segments can have on each other is limited. In each pair, the vertical wire can ignore the horizontal wire, or the voltage on the horizontal wire (true or false) can cause the vertical wire to change from true to false. If the vertical wire is already false, it cannot be changed to true.

It is important that the vertical wire cannot be changed from false to true. Usually a vertical wire is affected by several horizontal wire segments. At the beginning of a clock cycle, the value of each vertical wire is set to true. If any of the horizontal segments change the vertical from true to false, no set of conditions can change the vertical segment back to true until the next clock cycle.

It is possible to program the effect that a horizontal segment has on a vertical segment. One choice is that for a particular cell the vertical segment may be instructed to ignore the value of the horizontal segment. This results in the horizontal term not being included in the vertical product (a null operation). If, on the other hand, the vertical segment is not programmed to ignore the value of the horizontal segment at a crossing, the value of the horizontal segment is true. or the vertical can be programmed to be false if the value of the horizontal segment is false. This gives three different kinds of segment dependencies, as shown in FIG. 3.

FIG. 3 shows the programming of a cell by placement of a number at the intersection. We shall place the number 1 in the upper left quadrant when the cell is programmed so that the value true on the horizontal segment does not change the vertical value; that is, the horizontal false makes the vertical false. We shall place the number 0 if the horizontal true makes the vertical false. No number means the vertical segment does not depend on that horizontal segment.

This set of functions allows creation of vertical terms that are the Boolean conjunction (or product) of a series of horizontal terms, inverses of the horizontal terms, or both. Consider the following figure, FIG. 4. Assume that the values of bits A, B, and C, are held on the horizontal segments as labeled. Then the first vertical segment starts as true and can remain as true only if both A and C are true. That is, if A or C or both are false, then the first vertical segment is false. The first vertical segment is thus the product of A and C. Note that it is not affected by B. Similarly, the second vertical segment will hold a value that is A times B-inverse times C-inverse. The third segment will hold B-inverse.

The functioning of this ATM is different on each of two halves of a clock cycle. In the first half-cycle, the horizontal segments affect the vertical segments as described above. In the second half-cycle, the vertical values affect the horizontal in the same way. We represent the programming of how the vertical segments affect the horizontal during the second half-tick by numbers or lack of numbers in the lower left corner of the crossing.

Continuing the previous figure, we add two new horizontal segments, each with dependency on the vertical. This is shown in FIG. 5. A fourth horizontal segment X is the product on the inverse of the first two verticals. A fifth horizontal Y is the product of the first vertical times the inverse of the third.

Considering the values the verticals acquired on the first half-cycle, we get the following equations:

$$X = \overline{A \cdot C} \cdot \overline{A \cdot B \cdot C}$$

$$Y = (A \cdot C) \cdot \overline{(B)}$$

Continuing in this way we could produce any product of terms and inverse of terms. Of course, this is sufficient to produce any Boolean function.

The cells in this preferred embodiment of an ATM are connected in both horizontal and vertical directions. Because of the relationship between maximum clock speed and maximum term size, and because of the need to support some communication over large distances (many terms), the cells need to be connected to more than their nearest neighbors. Since the limitation on term size is on the maximum distance between any two term and not the total number of terms, additional longer distance connections within a term relaxes this limitation. From theory and measurements we know that the frequency of needed lengths decreases with length. Thus we need a pattern of connections that decreases in frequency of connection as cells get further apart.

The interconnection pattern in this preferred embodiment is called "Two Dimensional Phase Shifted Packed Exponential Cycles" or 2D-PEC. This pattern is based on a much simpler one dimensional pattern called simply "Packed Exponential Cycles" (PEC).

PEC in the one dimensional form provides four connections to each cell in a one dimensional vector of cells. For reference, let us number the cells from one. First, connect all cells to their nearest neighbors. Next, connect all odd-numbered cells (beginning with 1) to their nearest odd-numbered neighbors (which will be distance 2 away). Beginning with cell 2, connect all the cells that are distance 4 away. That is, cells 2, 6, 10, 14, . . . Beginning with cell 4, connect all cells that are distance 8 away. That is cells 4, 12, 20, 28 . . . Continue by connecting from 8 at distance 16, from 16 at distance 32, etc, until all the cells of interest have been connected to four others in the vector. A segment of cells connected by PEC is shown in FIG. 6.

A useful property of PEC is the distribution of interconnections as functions of interconnect distance. One half of all connections are at distance 1. One half of those remaining are at distance 2. One half of those still remaining are at distance 4. The sequence continues; for any integer n, there exist connections of distance $2^n$, and their fraction of the total number of connections is $2^{n+1}$.

A vector connected by PEC is scalable to arbitrary size while restricting interconnection resources. The average connection length taken over the entire vector approaches, but never exceeds, 2. The number of connections that must cross each cell grows only with log2 of the number of cells. Never the less, the aggregate average distribution of interconnections as a functions of distance r is $1/r^2$. This appears to meet the interconnectivity requirements of many connected systems.

Figure 7:
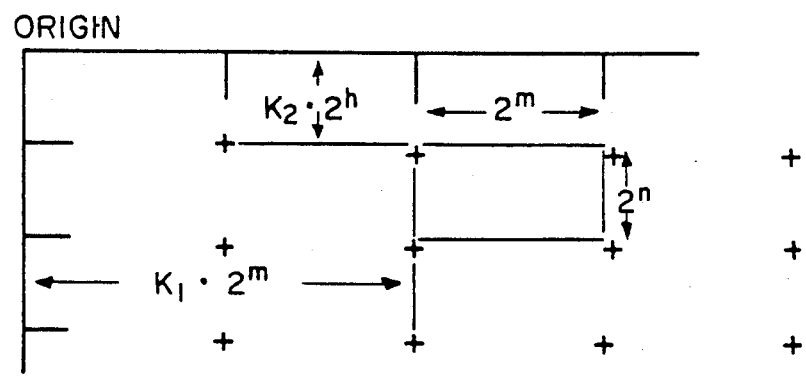
FIG. 7 is a schematic illustration of the tile placements constraints that are assumed in this example embodiment of an ATM. A tile can only be placed such that it is aligned with a grid of its own size, which is aligned with the origin of the 2D-PEC origin.

A Two Dimensional Phase Shifted PEC connections pattern can be created on the quarter-plane created by the whole numbers (x,y) in such a way that useful connection properties are provided between tiles in the plane. In this writing, the size and location of a tile is constrained as follows: the dimensions of a tile must be $2^m$ by $2^n$, (m and n are whole numbers), and the tile must be placed such that it is a whole number of its own dimensions from the 2D-PEC origin. This is illustrated in FIG. 7.

The 2D-PEC pattern is created by shifting the phase of each row relative to the first (y=0) row. The amount of this phase shift is given in the table of FIG. 8. In that table, the total phase shift is the sum of all of the component shifts of the distances listed with a 1. It will be noted that the size of this table is infinite, with the pattern of the component phase shifts repeating arbitrarily out to the left. However, the PEC pattern repeats on interval $2^n$ with changes only in the $2^n$ the cell. Thus, for any finite segment size of interest, the higher order phase shift components will make no appearance and may be ignored. The table is intended to extend infinitely downward also, with the pattern of phase shifts continuing as before.

The 2D-PEC pattern created from the table is shown in FIG. 9. Consider two like tiles of area $2^{m+n}$ with their upper right left corners shifted horizontally or vertically by $2^k$, where $k \leq m+n$. The tiles will share $2^{m+n-k}$ connections of length greater than 2. (Of course, if they are adjacent, their will be additional connections of length 1 between their edges.) This is shown FIG. 10.

2D-PEC provides a regular pattern of interconnection that is scalable to large size while restricting interconnection resources.

To keep this ATM as simple as possible, the circuitry for the program information defining the operation and interconnection of the ATM cells will be controlled by circuitry that is functionally separate from the ATM array. Further, there will be no provision for program change while the ATM is in operation. Taken together, these decisions dictate a "batch mode" operation of one version of an ATM whereby a program is loaded and run, and then the system must be stopped and a new program loaded when a different set of operations are to be performed.

A major factor in the usefulness of an ATM System is the number of cells in the system and the efficiency with which they can be used. Size estimates based on the architecture and interconnection strategies described in this specification show that one can reasonably fabricate an ATM with an array of about 100 by 100 cells (10,000 total) on a single VLSI circuit.

What is claimed is:

1. An algebraic transform machine comprising a regular array of functionally equivalent elements interconnected by a regular network of signal paths, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable values of one or more of the element's signal paths, wherein signal paths from multiple elements programmably and reprogrammably contribute their algebraic variable values as term elements to algebraic operations with the result of each operation held on a signal path common to all of the elements contributing to that operation.

2. An algebraic transform machine comprising a regular array of functionally equivalent elements interconnected by a regular network of signal paths, each said element associated with a first and a second signal path, each said signal path adapted to hold an algebraic variable value and each signal path including switching apparatus allowing the signal path to be programmably and reprogrammably enabled and disabled, and each said element adapted to store control signals allowing the element to programmably and reprogrammably affect the algebraic variable value of the element's signal paths as a function of the element's control signals and the algebraic variable values of the element's signal paths, wherein during a first period of a repeating cycle, each first signal path can programmably and reprogrammably contribute its algebraic variable value as a term element to an algebraic operation, the result of which is held on a second signal path common to all of the elements contributing to the operation, and wherein during a second period, each second signal path can programmably and reprogrammably contribute its algebraic variable value as a term element to an algebraic operation, the result of which is held on a first signal path common to all of the elements contributing to the operation.

3. An algebraic transform machine comprising a regular array of functionally equivalent elements interconnected by a regular network of signal paths, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable value of one or more of the element's signal paths during a clock cycle having periods, wherein, during each period of a clock cycle, the algebraic variable value of one or more of the element's signal paths assigned to that period is affected, whereby a composition of multiple elements performs algebraic subfunctions and a composition of said subfunctions performs algebraic functions.

4. An algebraic transform machine comprising a regular array of functionally equivalent elements interconnected by a regular network of signal paths, each said element controlling a first and a second signal path, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of the element's first signal path as a function of the element's control signals and the algebraic variable value of the element's second signal path during the first half of a clock cycle, and to programmably and reprogrammably affect the algebraic variable value of the element's second signal path as a function of the element's control signals and the algebraic variable value of the element's first signal path during the second half of the clock cycle, whereby a composition of multiple elements performs algebraic subfunctions and a composition of said subfunctions performs algebraic functions.

5. An algebraic machine comprising a regular array of functionally equivalent elements interconnected by a regular network of signal paths, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable value of one or more of the element's signal paths during a clock cycle having periods, wherein, during each period of a clock cycle, the algebraic variable value of one or more of the element's signal paths assigned to that period is affected, whereby signal paths from multiple elements programmably and reprogrammably contribute their algebraic variable values as term elements to algebraic operations with the result of each operation held on a signal path common to all of the elements contributing to that operation.

6. An algebraic transform machine comprising a regular array of functionally equivalent elements interconnected by a regular network of signal paths, each said element controlling a first and a second signal path, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of the element's first signal path as a function of the element's control signals and the algebraic variable value of the element's second signal path during the first half of a clock cycle, and to programmably and reprogrammably affect the algebraic variable value of the element's second signal path as a function of the element's control signals and the algebraic variable value of the element's first signal path during the second half of the clock cycle, whereby during the first half of the clock cycle, each first signal path can programmably and reprogrammably contribute its algebraic variable value as a term element to an algebraic operation, the result of which is held on a second signal path common to all of the elements contributing to the operation, and whereby during the second half of the clock cycle, each second signal path can programmably and reprogrammably contribute its algebraic variable value as a term element to an algebraic operation, the result of which is held on a first signal path common to all of the elements contributing to the operation.

7. An algebraic transform machine comprising a regular array of functionally equivalent elements interconnected by a regular network of signal paths based on a Packed Exponential Cycle pattern, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable values of one or more of the element's signal paths, whereby a composition of multiple elements performs algebraic subfunctions and a composition of said subfunctions performs algebraic functions.

8. An algebraic transform machine comprising a regular array of functionally equivalent elements interconnected by a regular network of signal paths in a Two Dimensional Phase Shifted Packed Exponential Cycle Pattern, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable values of one or more of the element's signal paths, whereby a composition of multiple elements performs algebraic subfunctions and a composition of said subfunctions performs algebraic functions.

9. An algebraic transform machine comprising a regular array of functionally equivalent elements interconnected by a regular network of signal paths, said elements and said signal paths being optical circuits, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable values of one or more of the element's signal paths, whereby a composition of multiple elements performs algebraic subfunctions and a composition of said subfunctions performs algebraic functions.

10. An algebraic transform machine comprising a regular array of functionally equivalent elements interconnected by a regular network of signal paths, said elements and said signal paths being a mixture of optical and electrical circuits, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable values of one or more of the element's signal paths, whereby a composition of multiple elements performs algebraic subfunctions and a composition of said subfunctions performs algebraic functions.

11. An algebraic transform machine comprising a regular array of functionally equivalent elements interconnected by a regular network of signal paths, each said signal path adapted to hold an algebraic variable value and each said signal path including switching apparatus allowing the signal path to be programmably and reprogrammably enabled and disabled, and each said element adapted to store control signals allowing the element to programmably and reprogrammably affect the algebraic variable value of one or more of the element's signal paths as a function of the element's control signals and the algebraic variable values of one or more of the element's signal paths, whereby a composition of multiple elements performs continuous analog algebraic subfunctions and a composition of said subfunctions performs continuous analog algebraic functions.

12. The machine of claims 1, 2, 7, 8, 9, 10 or 11 wherein operation of said elements is synchronized by a clock.

13. The machine of claims 1, 2, 3, 4, 5, 6, 7, 8, 9, 10 or 11 wherein each said element comprises a signal path crossing and circuitry associated with the crossing.

14. The machine of claims 1, 2, 3, 4, 5, 6, 7, 8, 9, 10, or 11 wherein said array comprises a grid of horizontal and vertical crossing signal paths.

15. The machine of claims 1, 2, 3, 4, 5, 6, 9, 10, or 11 wherein said signal paths between said elements are a nearest neighbor pattern.

16. The machine of claims 1, 2, 3, 4, 5, 6, 9, 10, or 11 wherein said signal paths between said elements is based on a Packed Exponential Cycle pattern.

17. The machine of claims 1, 2, 3, 4, 5, 6, 9, 10, or 11 wherein said signal paths between said elements are a Two Dimensional Phase Shifted Packed Exponential Cycle pattern.

18. The machine of claims 1, 2, 3, 4, 5, 6, 7, 8, or 11 wherein said elements and said signal paths are electrical circuits.

19. The machine of claims 1, 2, 3, 4, 5, 6, 7, 8, 9, 10, or 11 wherein said array is fabricated as one or more Integrated Circuits.

20. The machine of claims 1, 2, 3, 4, 5, 6, 7, 8, 9, 10, or 11 wherein said array is fabricated as one or more wafer-scale devices.

21. The machine of claims 1, 2, 3, 4, 5, 6, 7, 8, or 11 wherein said elements and said signal paths are optical circuits.

22. The machine of claims 1, 2, 3, 4, 5, 6, 7, 8, or 11 wherein said elements and said signal paths are a mixture of optical and electrical circuits.

23. The machine of claims 3, 4, 7, 8, 9, 10, or 11 wherein a program comprising said algebraic functions and subfunctions is stored by functionally separate circuitry.

24. The machine of claims 3, 4, 7, 8, 9, 10, or 11 wherein said algebraic functions perform computation.

25. The machine of claims 3, 4, 7, 8, 9, 10, or 11 wherein said algebraic functions provide interconnection between modules of systems.

26. The machine of claims 3, 4, 7, 8, 9, or 10 wherein said algebraic functions and subfunctions are Boolean functions.

27. The machine of claims 3, 4, 7, 8, 9, or 10 wherein said algebraic functions and subfunctions are continuous analog functions.

28. The machine of claims 1, 2, 5, or 6 wherein a program comprising said algebraic operations is stored by functionally separate circuitry.

29. The machine of claims 1, 2, 5, or 6 wherein said algebraic operations perform computation.

30. The machine of claims 1, 2, 5, or 6 wherein said algebraic operations provide interconnection between modules or systems.

31. The machine of claims 1, 2, 5, or 6 wherein said algebraic operations are Boolean operations.

32. The machine of claims 1, 2, 5, or 6 wherein said algebraic operations are continuous analog operations.

* * * * *

UNITED STATES PATENT AND TRADEMARK OFFICE
CERTIFICATE OF CORRECTION

PATENT NO. : 5,056,053

DATED : October 8, 1991

INVENTOR(S) : W. Worth Kirkman and T. Michael Louden

It is certified that error appears in the above-indentified patent and that said Letters Patent is hereby corrected as shown below:

Column 6, line 30: delete "$\bar{A} \cdot C$" and insert therefor -- $\overline{\bar{A} \cdot C}$ --

Column 8, line 45: delete "$A \cdot \bar{B} \cdot C$" and insert therefor -- $\overline{A \cdot \bar{B} \cdot C}$ --

Signed and Sealed this

Fifteenth Day of February, 1994

Attest:

BRUCE LEHMAN

*Attesting Officer*  *Commissioner of Patents and Trademarks*